United States Patent
Daly et al.

(10) Patent No.: US 7,364,795 B2
(45) Date of Patent: Apr. 29, 2008

(54) ULTRAVIOLET RADIATION CURED POWDER COATINGS FOR STAINED WOOD

(75) Inventors: Andrew T. Daly, Sinking Spring, PA (US); Grant E. Schlegel, Macungie, PA (US); Michael L. Spera, Mohnton, PA (US)

(73) Assignee: Rohm and Haas Company, Philadelphia, PA (US)

( * ) Notice: Subject to any disclaimer, the term of this patent is extended or adjusted under 35 U.S.C. 154(b) by 550 days.

(21) Appl. No.: 10/987,113

(22) Filed: Nov. 12, 2004

(65) Prior Publication Data

US 2005/0136277 A1  Jun. 23, 2005

Related U.S. Application Data

(60) Provisional application No. 60/531,869, filed on Dec. 23, 2003.

(51) Int. Cl.
*B32B 27/38* (2006.01)

(52) U.S. Cl. ............... 428/413; 428/317; 428/325; 428/421; 427/195; 427/317; 427/325; 427/397; 427/386; 427/475; 427/557

(58) Field of Classification Search ........... 428/413, 428/317, 325, 421; 427/195, 317, 325, 397, 427/386, 475, 557
See application file for complete search history.

(56) References Cited

U.S. PATENT DOCUMENTS 5,789,039 A * 8/1998 Biller et al. ............ 427/508
6,017,640 A * 1/2000 Muthiah et al. .......... 428/514
6,296,939 B1 * 10/2001 Kunze et al. ............ 428/413
6,852,765 B2 2/2005 Decker et al.
6,861,475 B2 * 3/2005 Ilenda et al. ............ 525/80

FOREIGN PATENT DOCUMENTS

| EP | 0947254 A2 * | 6/1999 |
|---|---|---|
| EP | 0947254 A2 | 10/1999 |
| WO | WO 00/08109 | 2/2000 |
| WO | WO 03/010248 A1 | 2/2003 |

* cited by examiner

*Primary Examiner*—Leszek Kiliman
(74) *Attorney, Agent, or Firm*—Andrew E. C. Merriam

(57) ABSTRACT

The present invention provides smooth and even ultraviolet (UV) cured powder coatings for wood comprising one, two or three layers of one or more waterborne stains, or clear or tinted waterborne basecoat coatings and one or more topcoat layers of clear or tinted clear powder coatings made from one or more than one free radical UV curing resin, one or more than one photoinitiator, and one or more than one post-blend dry flow additive, such as fumed alumina. The coatings of the present invention have a natural wood appearance, are foam free and fully coat substrates at powder coating thicknesses ranging from 0.5 mil (12.7 μm) to 2.0 mil (50.8 μm). Accordingly, the coatings will fully and evenly coat uneven, beveled and/or routered substrate surfaces, including open grain natural wood substrates, such as oak. In addition, the present invention provides a method for making coatings comprising applying one or more waterborne stain to the wood to form a stain layer, drying or curing the said stain layer, sanding or grinding to de-nibb the said stain layer, applying clear or tinted UV curing coating powder to the stained substrate, flowing out the applied coating powder to form a continuous film, and UV curing the film formed from the powder.

9 Claims, No Drawings

ULTRAVIOLET RADIATION CURED POWDER COATINGS FOR STAINED WOOD

CROSS REFERENCE TO RELATED PATENT APPLICATIONS

This is a non-provisional application of now abandoned U.S. provisional application Ser. No. 60/531,869 filed Dec. 23, 2003.

FIELD OF THE INVENTION

This invention relates to powder coatings on stained wood made from ultraviolet (UV) radiation curing coating powders and to methods for making such coatings. More particularly, this invention relates to clear and translucent powder coatings formed over aqueous or waterborne stains on natural wood, such as hardwood, and methods for making such coatings.

BACKGROUND

Wood finishers would like to use waterborne or powder coating finishing products to reduce their use of volatile organic compounds (VOCs). So far, however, powder coatings when applied to a natural wood substrate have resulted in uneven finishes suffering from bubbling or foaming in the coating caused by the outgassing of the wood, from a cloudy, blotched appearance and/or from orange peel or undesirable texture. Meanwhile, with waterborne wood coatings, a long, labor intensive process must be followed to get an acceptable finish.

To make a coating on wood from either waterborne or solvent borne coatings, several coats of sealers and topcoats are applied onto the stain to help to fill in the grain, while sealers are more sandable and may be sanded smooth before applying several topcoats to fill in the grain, each layer of which must be sanded. The liquid wood coating process is thus very labor intensive. In addition and unlike solvent borne stains, waterborne stains and coatings cause "grain swell" in natural wood, making the grain rise and requiring de-nibbing of the grain during sanding. Accordingly, waterborne coating of wood requires pre-sanding or grinding, application of stain, drying, application of sealer, drying, de-nibbing, sanding, and application of two or more topcoat layers, followed by drying, de-nibbing and sanding. Further, to improve the quality of the finish of any liquid wood coating, additional topcoats may be necessary.

Even with the labor intensive liquid wood coating process, coating buildup or "fatty pore" in the pores of large or open grain wood, such as oak, provides coatings appearing to have wavy rings around the pores. Such coatings are uneven and thus have an unnatural appearance.

A recent U.S. Pat. No. 6,296,939, to Kunze et al., discloses thermal and UV cured powder coating of heat sensitive substrates, such as wood, after they have been heated to from 80 to 120° C. with microwave radiation. This process eliminates much of the labor involved in wood coating. However, powder coatings formed directly on wood by this process foam or bubble. To solve this problem with coating wood substrates, Kunze et al. adds to the process applying a water based conductive paint to the substrate prior to microwave heating, followed by de-nibbing, sanding or grinding and powder coating the wood substrate. Nevertheless, the Kunze et al. coatings made with conductive paints and powder coatings cannot be less than 2.0 mils thick (50 μm) or they are undesirably uneven. None of Kunze's coatings avoid "fatty pore". Further, regardless of thickness, the Kunze et al. coatings are disclosed only for wood "tiles" or flat pieces and give poor coverage of edges and of any substrate surface which is not flat, i.e. bevels, routered areas, trim and moldings. Still further, the conductive paint coatings of Kunze et al. have a cloudy appearance which makes them undesirable as clearcoats or tinted, translucent clearcoats.

Accordingly, there remains a need for clear or translucent powder coatings for natural wood which can provide an acceptable clear or tinted clear finish that is blemish or foam free. Further, there remains a need for a process for coating natural wood which reduces the labor required to make liquid stain on wood and provides a reliable clearcoat or tinted clearcoat finish on wood. In accordance with the present invention, the present inventors have surprisingly met these needs without any of the drawbacks of prior powder and liquid coatings for natural wood.

STATEMENT OF THE INVENTION

In a first aspect, the present invention provides even, smooth or smooth matte clearcoats and translucent clearcoats from UV curing coating powders comprising one or more wood substrate coated with one, two or three layers, preferably one layer, of one or more waterborne stain or clear or tinted waterborne basecoat coatings, hereinafter referred to as a "stain", and one or more topcoat layers of clear or translucent clear (tinted) powder coatings comprising one or more than one free radical UV curing resin, one or more than one photoinitiator, and one or more than one dry flow additive, wherein the coating powder has an average particle size of from 5 μm or more, for example, 10 μm or more or 18 μm or more, and an average particle size of 30 μm or less or 25 μm or less, or 23 μm or less. Preferably, the average particle size of the coating powder is less than the ultimate thickness of a powder coating made from the coating powder. The powder composition may further comprise one or more than one crystalline crosslinker resin, such as a vinyl ether resin. The inventive clearcoats and translucent clearcoats fully cover and seal the substrate, including uneven, beveled and routered substrates, at thicknesses of as little as 0.5 mil (12.7 μm) to 3.0 mil (76.2 μm), preferably 0.5 mil (12.7 μm) to 2.0 mil (50.8 μm).

The coatings of the present invention fully cover wood substrates, even along edges, curvilinear surfaces, routered and/or beveled areas, as are commonly found in furniture, cabinets, doors, wood moldings and trim. Desirably, the invention provides smooth and even powder coatings for open grain natural wood substrates which call for fillers or sealers, such as those chosen from oak, mahogany, ash, hickory, teak and walnut, which coatings do not suffer from "fatty pore". However, the coatings of present invention can be used on, and may even be preferred for, more easily coated wood substrates, such as close grain natural wood having more uniform pore sizes, and not calling for fillers or sealers, chosen from alder, aspen, basswood, beech, birch, cedar, cherry, fir, hemlock, maple, pine and spruce.

In a second aspect, the present invention provides a method of making UV cured clear or translucent clear finishes on wood comprising of providing one or more waterborne stain compositions and one or more UV curing powder coating compositions, applying one or more waterborne stain to the wood, drying or curing the thus formed waterborne stain layer, preferably by directional convection heat, sanding or grinding to de-nibb the waterborne stain layer, applying UV curing coating powder to the stained substrate, flowing out the applied coating powder to form a continuous film, and UV curing the film formed from the powder. In addition, white wood sanding or pre-sanding the substrate with 120, 220 and then 320 grit sandpaper or pre-grinding the substrate surface with equivalent grinding media prior to applying stain minimizes grain swell or grain raising caused by the stain and, further, aids in coating evenness and smoothness.

DETAILED DESCRIPTION

UV cured clear powder coatings provide a number of advantages when used in place of liquid sealers and top coats over waterborne stains. Surprisingly, it has been found that waterborne stains will allow even thin UV cured powder coatings, i.e. having a thickness of from 0.5 to 3.0 mil (12.7 to 76.2 µm), to fully penetrate and seal large pores in the wood which would otherwise allow moisture to penetrate, thus forming a thin finish that appears even and that fully covers the wood substrate, including edges curvilinear surfaces, routered and/or beveled areas. Powder coating thicknesses may range from 0.5 mil (12.7 µm) or more, for example, 1.0 mil (25.4 µm) or more, to as thick as 3.0 mil (76.2 µm) or less, or 2.0 mil (50.8 µm) or less. Accordingly, the inventive powder coatings can wet out and sealingly protect open grain wood which has such large pores as to require several sealer or filler layers. Further, the inventive powder coatings are even and do not suffer from "fatty pore" or coating buildup problems. Still further, the UV cured powder coatings of the present invention cover rough surfaces grain raised surface in a single coat to provide a smooth finish. The inventive powder coatings may be applied to natural wood, plywood, wood composites and engineered wood. The coatings produced according to the present invention are smooth, even and have a natural wood appearance.

The process of the present invention reduces the number of coating layers used to clearcoat or stain wood and, as a result, the number of sanding and coating steps required. The coatings thus produced have acceptable adhesion, appearance, and stain resistance properties. Still further, powder coatings can also be reclaimed, which could result in 95% material usage, 50% better than if liquid coatings were used.

For purposes of better defining the coating powder and powder coating, the term "coating powder", "powder" or "powder coating composition" refers herein to the particulate material, and the term "powder coating" refers to the coating applied to a substrate or article.

All ranges recited are inclusive and combinable. For example, an average particle size of 1.3 µm or more, for example, 1.5 µm or more, which may be 4.5 µm or less, or 4.0 µm or less, will include ranges of 1.3 µm or more to 4.5 µm or less, 1.5 µm or more to 4.5 µm or less, 1.5 µm or more to 4.3 µm or less, and 1.3 µm or more to 4.3 µm or less.

As used herein, the phrase "average particle size", refers to particle diameter or the largest dimension of a particle as determined by laser light scattering using a Malvern Instruments, Malvern UK, device located at the Rohm and Haas powder coatings Reading, Pa. Facility, Equipment Serial #: 34315-33.

As used herein, the phrase "average particle size polydispersity (pD)" refers to the ratio of the weight average particle size to the number average particle size, as determined by laser light scattering using a Malvern Instruments, Malvern, UK, device located at the Rohm and Haas powder coatings Reading, Pa. Facility, Equipment Serial #: 34315-33.

As used herein, the "glass transition temperature" or $T_g$ of any polymer may be calculated as described by Fox in *Bull. Amer. Physics. Soc.*, 1, 3, page 123 (1956). The $T_g$ can also be measured experimentally using differential scanning calorimetry (rate of heating 20° C. per minute, $T_g$ taken at the midpoint of the inflection or peak). Unless otherwise indicated, the stated $T_g$ as used herein refers to the calculated $T_g$.

As used herein, unless otherwise indicated, the phrase "melt viscosity" refers to the melt viscosity of a polymer or resin as measured in centipoises at 150° C. using a Brookfield Viscometer.

As used herein, the term "(meth)acrylate" means acrylate, methacrylate, and mixtures thereof and the term "(meth) acrylic" used herein means acrylic, methacrylic, and mixtures thereof.

As used herein, unless otherwise indicated, the phrase "molecular weight" refers to the weight average molecular weight of a polymer as measured by gel permeation chromatography.

As used herein, unless otherwise indicated, the phrase "per hundred parts resin" or "phr" means the amount, by weight, of an ingredient per hundred parts, by weight, of the total amount of resin contained in a coating powder, including cross-linking resins.

As used herein, unless otherwise indicated, the phrase "polymer" includes, independently, polymers, oligomers, copolymers, terpolymers, block copolymers, segmented copolymers, prepolymers, graft copolymers, and any mixture or combination thereof.

As used herein, unless otherwise indicated, the phrase "resin" includes, independently, polymers, oligomers, copolymers, terpolymers, block copolymers, segmented copolymers, prepolymers, graft copolymers, and any mixture or combination thereof.

As used herein, the phrase "waterborne stain" means any waterborne basecoat used to color or tint wood and, in addition, includes a clear waterborne basecoat.

As used herein, the phrase "wt. %" stands for weight percent.

In general, coating powders comprise one or more than one free radical curing unsaturated polyester resin, acrylic terminated or acrylic side chain functional epoxy, urethane, polyester or polyether polymer or resin, unsaturated vinyl ether resin, allyl ether resin, allyl ester resin, or mixtures thereof, one or more than one free radical photoinitiator, and one or more post-blend dry flow additive, optionally including one or more than one wax. Where resins or polymers other than acrylates are used, the powder coatings may comprise one or more than one crystalline crosslinker resin, such as a vinyl ether terminated urethane.

In one embodiment, because of the excellent weatherability and flexibility of unsaturated polyester resins, coating powder compositions for providing low gloss, weatherable coatings comprise one or more than one unsaturated polyester resin in combination with one or more than one wax, one or more than one photoinitiator and one or more than one crystalline crosslinker resin. The powder composition can further comprise other free radical curing resins, including (meth)acrylic terminal or side chain functional urethanes, vinyl esters, allyl ethers, allyl esters, or mixtures thereof.

Additional components such as heat-activated catalysts, pigments, fillers, flow control agents, dry flow additives, anticratering agents, surfactants, texturing agents, light stabilizers, matting agents, photosensitizers, wetting agents, anti-oxidants, plasticizers, opacifiers, stabilizers, and degassing agents, such as benzoin, can also be present.

The coating powder composition employs one or more free radical UV curing polymers or resins. In free radical curing mechanisms, the reactive functionality of the resin reacts during cure by means of free radical (uncharged) intermediate species. The resin itself may be a polymer, oligomer, or monomer that has at least two unreacted functional groups capable of crosslinking, polymerizing, or other reaction that leads to the coating. Accordingly, free radical curing resins generally have, on average, at least two ethylenically unsaturated groups per molecule bound, for example, to an aliphatic, aromatic, cycloaliphatic, araliphatic, or heterocyclic structure, or to an oligomer or polymer such as, for example, an epoxy resin or polymer, a polyester, a polyurethane, a polyether, a polyolefin, a polycarbonate, or (meth)acrylic polymer. In addition, (meth) acrylic polymers may be used which have both terminal and side-chain acrylic groups.

Suitable unsaturated polyesters may be formed by reacting di- or polyfunctional carboxylic acids (or their anhydrides) and di- or polyhydric alcohols. The unsaturation is typically supplied by the carboxylic acid, although it is possible to supply it through the alcohol. Monohydric alcohols, e.g. lower alkanols, or monofunctional carboxylic acids (or their esters) may be employed for chain termination purposes.

Suitable ethylenically unsaturated di- or polyfunctional carboxylic acids (or their anhydrides) include, for example, maleic anhydride, fumaric acid, itaconic anhydride, citraconic anhydride, mesaconic anhydride, aconitic acid, tetrahydrophthalic anhydride, nadic anhydride, dimeric methacrylic acid, endo-cis-bicylco[2,2,1]-5-heptene-2,3-dicarboxylic acid, 1,4,5,6,7,7-hexachlorobicyclo[2,2,1]-5-heptene-2,3-dicarboxylic acid (chlorenedic acid), mesaconic acid, dimeric methacrylic acid, and methylbicyclo[2,2,1]-heptene-2,3-dicarboxylic acid, and the like, with maleic anhydride, fumaric acid, or their mixtures being preferred. Aromatic and saturated acids may be employed in conjunction with the unsaturated acids to reduce the density of the ethylenic unsaturation and provide desired chemical and mechanical properties, such as higher and lower $T_g$ or acid number.

Suitable saturated and aromatic di- or polycarboxylic acids (or their anhydrides) include, for example, tetrahydrophthalic acid, isophthalic acid, tetrachlorophthalic acid, tetrabromophthalic acid, phthalic anhydride, adipic acid, terephthalic acid, trimellitic acid, azeleic acid, sebacic acid, dimethylterephthalate, dimethylisophthalate, succinic acid, dodecanedicarboxylic acid, hexahydrophthalic acid, hexachloro-octahydromethanonaphthalene dicarboxylic acid, malonic acid, glutaric acid, oxalic acid, pimelic acid, suberic acid, and pyromellitic anhydridecyclohexane dicarboxylic acid, acid, hexahydrophthalic acid, trimellitic acid, pyromellitic anhydride, dimeric and trimeric fatty acids, such as oleic acid, if desired as a mixture with monomeric fatty acids, dimethyl terephthalate, bis-glycol terephthalate, and also cyclic monocarboxylic acids, such as benzoic acid, p-tert-butylbenzoic acid or hexahydrobenzoic acid, and the like.

Suitable monofunctional acids for chain termination include, for example, acrylic acid, methacrylic acid, lower alkanol esters of dicarboxylic acids, linoleic acid, linolenic acid, geranic acid, dehydrogeranic acid, sorbic acid, heptatri-1,3,5-ene-1-carboxylic acid, nonatetra-1,3,5,7-ene-1-carboxylic acid, other fatty acids of vegetable oils, abietic acid, benzoic acid, and the like.

Suitable dihydric alcohols include, for example, ethylene glycol, diethylene glycol, triethylene glycol, 1,2-propylene glycol, 1,3-propylene glycol, 1,4-dimethoxy cylcohexane, 1,2-butylene glycol, 1,3-butylene glycol, 1,4-butylene glycol, 1,2-cyclopentanediol, 1,3-cyclopentanediol, 1,4-cyclopentanediol, 1,2-cyclohexanediol, 1,3-cyclohexanediol, 1,4-cyclohexanediol, 1,4-cyclohexanedimethanol, 4,4'-methylene-bis(cyclohexanol), 4,4'-isopropylidene-bis(cyclohexanol), 1,3-bis(hydroxymethyl)cyclohexane, 1,3-bis(hydroxyethyl)cyclohexane, 1,3-bis(hydroxypropyl) cyclohexane, 1,3-bis(hydroxyisopropyl)cyclohexane, xylene glycol, bisphenol A, hydrogenated bisphenol A, bisphenol A/propylene oxide adducts, hydroquinone/propylene oxide adducts, hydroquinone/ethylene oxide adducts, neopentyl glycol, 1,6-hexanediol, 2,2,4-trimethyl-1,3-pentanediol, 1,3-isobutanediol, 1,2-isobutanediol, 2,3-butanediol, and 2-butenediol(1,4), and the like.

Examples of polyols having 3 or more hydroxyl functional groups that are useful herein in small amounts to form branched polyesters, include glycerol, trimethylolpropane, pentaerythritol, allyl ether polyols, polyalkylene glycol ethers, 1,1,1-trimethylol ethane, sorbitol, mannitol, diglycerol, and dipentaerythritol. Instead of or in addition to the alcohol, such as (poly)ethylene glycol and (poly)propylene glycol, can be used.

Other suitable saturated or aromatic polyester forming reactants also include the reaction products of dicarboxylic acids and glycidyl compounds, for example, esters of 2,3-epoxy-1-propanol with monobasic acids containing 4 to 18 carbon atoms, such as glycidyl palmitate, glycidyl laurate and glycidyl stearate, the reaction product of alkylene oxides having 4 to 18 carbon atoms, such as butylene oxide, and glycidyl ethers such as octylene glycidyl ether.

Exemplary unsaturated polyesters include the maleate diesters and fumarate diesters of Formulas (1) and (2) respectively:

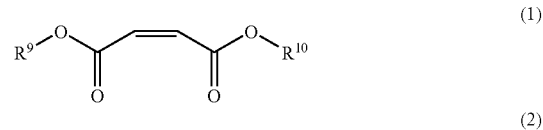

(1)

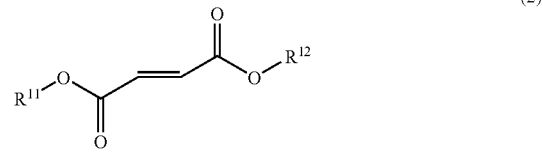

(2)

wherein $R^9$, $R^{10}$, $R^{11}$ and $R^{12}$ are each independently oligomers or polymers consisting of glycols and mono or polybasic acids.

Preparation of the unsaturated polyester can be carried out, for instance, by heating one or more of each of saturated or unsaturated glycols and acids in the presence of one or more esterification catalyst, such as tin catalysts, e.g., monobutyl tin oxide, stannous octoate, and monobutyl tin dilaurate, or acid catalysts, e.g., p-toluene sulfonic acid, methane sulfonic acid, or sulfuric acid, at from 204.4° C. (400° F.) to 248.9° C. (480° F.) for about 2 to 24 hours under nitrogen sparge and reacted to a given acid number or hydroxyl number, while collecting water formed by esterification. The resultant esterified prepolymer may be cooled to from 160° C. (320° F.) to 198.9° C. (390° F.). Glycol loss is measured by refractive index and the lost glycol is added, if needed. Then, unsaturated or saturated glycols and acids are charged to the reaction vessel again under nitrogen sparge. The reaction mixture is heated to from 177° C. (350° F.) to 232.2° C. (450° F.) for about 2 to 8 hours and reacted to a given acid number, viscosity and amount of water, if appropriate. The resultant resin is then inhibited with hydroquinone or other substituted free radical inhibitor.

Unsaturated polyesters resins can also be prepared by heating one or more of each of saturated and unsaturated polycarboxylic acids with polyols and one or more esterification catalyst, such as stannous oxide, under nitrogen sparge to from 160° C. to 248.9° C. for about 1 to 24 hours. The water of esterification is collected to measure the reaction. The glycol loss is again measured and glycol is added, if needed. The reaction is run to the appropriate acid or hydroxyl number and viscosity.

The unsaturated polyester resins can be crystalline, (semi) crystalline, or amorphous. Crystalline and (semi)crystalline unsaturated polyesters are generally preferred over amorphous unsaturated polyesters, since stable powder coatings with lower melt viscosity and better flow can be prepared more easily therefrom. Certain monomers impart crystallinity to the unsaturated polyesters. For example, dihydric alcohol monomers that are known to promote crystallinity include ethylene glycol, 1,4-butanediol, neopentyl glycol, and cyclohexanedimethanols. Dicarboxylic acid monomers that are known to promote crystallization include terephthalic acid and cyclohexane dicarboxylic acid.

Preferably, the unsaturated polyester resins are solid materials at room temperature, and can be easily formulated into powders or particulate form. Further, the preferred resins exhibit virtually no cold flow at temperatures up to 90° F. (34° C.) for desired long shelf life. They also have a $T_g$ below the flow temperature required for preservation of heat sensitive substrates, e.g. 40° C. or more, preferably 45° C. (113° F.) or more and no higher than 149° C. (300° F.), or 121° C. (250° F.) or less.

Suitable unsaturated polyester resins generally have a weight average (Mw) molecular weight of from 400 to 10,000, preferably 1,000 to 4,500. The degree of unsaturation may range from 2 to 20 weight percent (wt. %), preferably 4 to 10 wt. %, based on the weight of the unsaturated polyester resin. Furthermore, whether the unsaturated polyester resin contains hydroxyl functional groups or acid functional groups depends upon the —OH/—COOH molar ratio of the monomer mix. The resins containing hydroxyl functional groups may have a hydroxyl number of 5 to 100, while the resins containing acid functional groups may have an acid number of 1 to 80. For use in aqueous emulsion processing to make powders having a narrow particle size distribution, preferred unsaturated polyesters have an acid number of from 50 to 80.

Suitable acrylic terminated or acrylic side chain functional epoxy, urethane, polyester or polyether polymers or resins useful herein include unreacted acrylate or methacrylate terminal or side chain groups. The acrylic terminated or acrylic side chain functional polymers or resins include the reaction products of one or more acrylic monomer, oligomer or resin containing both unreacted acrylate or acrylic acid groups condensation reactive groups, i.e. hydroxyl, amine or carboxyl, with one or more co-reactive resin or polymer having condensation reactive functional groups. For example, hydroxyl functional acrylic monomer, oligomer or resin can be reacted with epoxy, carboxyl, isocyanate or amine functional co-reactive resin or polymer; carboxyl functional acrylic monomer, oligomer or resin can be reacted with epoxy, hydroxyl or amine functional co-reac-tive resin or polymer; epoxy functional acrylic monomer, oligomer or resin can be reacted with hydroxyl, epoxy, carboxyl, isocyanate or amine functional co-reactive resin or polymer; carboxyl functional acrylic monomer, oligomer or resin can be reacted with epoxy, hydroxyl or amine functional co-reactive resin or polymer; isocyanate functional acrylic monomer, oligomer or resin can be reacted with epoxy, carboxyl, amine or hydroxyl functional co-reactive resin or polymer; and amine functional acrylic monomer, oligomer or resin can be reacted with epoxy, carboxyl, isocyanate or hydroxyl functional co-reactive resin or polymer. The unsaturated acrylate or methacrylate polymer obtained in the aforesaid reaction may be one or more epoxy acrylate, urethane acrylate, polyester acrylate or polyether acrylate resin.

The acrylic terminated or acrylic side chain functional epoxy, urethane, polyester or polyether polymers or resins can prepared, for example, by polymerizing suitable acrylic backbone monomers and condensation reactive acrylic monomers in the presence of a radical initiator, i.e. azo-bis-isobuytronitrile (AIBN), and a molecular weight regulator, i.e. dodecyl mercaptan, in a nitrogen atmosphere, to form a condensation reactive acrylic resin or polymer, followed by reacting the acrylic resin or polymer with one or more co-reactive resin or polymer having condensation reactive functional groups, such as epoxy, urethane, polyester or polyether resin in the presence of heat and a condensation catalyst, e.g. esterification catalyst, such as tin or acid catalysts used to make a polyester, or acids or bases, e.g. amines, used to make a polyurethane. The co-reactive resin or polymer having condensation reactive functional groups may be dissolved in an appropriate solvent, such as butyl acetate, and then the condensation reactive acrylic resin or polymer can be added in a stepwise manner at temperatures from, for example, 66° C. to 149° C.°, until substantial completion of the reaction. This reaction can also be done without solvent by heating the reactants above their melting points. Alternatively, the acrylic polymers or resins may be made in one reaction by reacting condensation reactive acrylic monomers with co-reactive epoxy, urethane, polyester or polyether resin in the presence of heat and a condensation catalyst to make acrylic terminated polymers or resins.

In any condensation reaction, the heat must be closely monitored to assure that the acrylic acid or acrylate does not polymerize; so long as they are removed or denatured later, free radical inhibitors, such as hydroquinone, may be added in amounts of from 0.001 to 1.0 wt. %, based on the weight of the reactive resins to limit acrylic polymerization during condensation.

Suitable acrylic backbone monomers include $C_1$ to $C_{12}$ alkyl (meth)acrylates, such as methyl (meth)acrylate, ethyl (meth)acrylate, n-butyl (meth)acrylate, isobutyl (meth)acrylate, 2-ethylhexyl(meth)acrylate, and the like.

Suitable condensation reactive acrylic monomers may include carboxylic acid-functional monomers, such as acrylic acid and methacrylic acid; hydroxyl-functional monomers, such as 2-hydroxyethyl(meth)acrylate, 2-hydroxypropyl (meth)acrylate, 3-hydroxypropyl(meth)acrylate, 3,4-dihydroxybutyl(meth)acrylate, and 4-hydroxybutyl (meth)acrylate; epoxy-functional monomers, such as glycidyl (meth)acrylate, 2,3-epoxybutyl(meth)acrylate, 3,4-epoxybutyl(meth)acrylate, 2,3-epoxycyclohexyl(meth)acrylate, and 10,11-epoxyundecyl methacrylate; isocyanate functional monomers, such as meta-isopropenyl-α,α-dimethylbenzylisocyanate(TMI) and isocyanatoethyl(meth)acrylate; and amine functional monomers, such as $C_1$ to $C_6$ aminoalkyl(meth)acrylates.

Suitable resins or polymers that may be reacted with condensation functional acrylic monomers, oligomers and polymers include, for example, epoxidized bisphenol A resins, polyglycidyl methacrylate; acid, hydroxyl, or isocyanate functional polyester resins, such as acid-functional polyester prepared from neopentyl glycol, ethylene glycol, adipic acid and isophthalic acid; hydroxyl, or isocyanate functional polyurethane resins, such as the reaction product of one or more $C_1$ to $C_6$ aliphatic diol or glycol with one or more diisocyanate, such as isophorone diisocyanate (IPDI), methylene diisocyanate, hexamethylene diisocyanate (HDI), tetramethylxylylene diisocyanate (TMXDI), methylene biscyclohexyl isocyanate, trimethylhexamethylene diisocyanate, hexane diisocyanate, hexamethylamine diisocyanate, methylenebiscyclohexyl isocyanate, toluene diisocyanate, 1,2-diphenylethane diisocyanate, 1,3-diphenylpropane diisocyanate, diphenylmethane diisocyanate, dicyclohexylmethyl diisocyanate, and the dimers, uretdiones, isocyanurates, and biurets thereof. A wide variety of epoxy resins, which have $T_g$s ranging of from 30 to 150° C., may be reacted with condensation functional acrylic monomers, oligomers and polymers. Examples of suitable epoxy resins may include aliphatic, aromatic, cycloaliphatic, araliphatic or heterocyclic epoxy structures. Exemplary useful structures may be based on either monocylic phenols, for example, resorcinol or hydroquinone, or on polycyclic phenols, for example bisphenol F or bisphenol A.

In an embodiment of the present invention, powder coatings comprise one or more epoxy (meth)acrylates, i.e. acrylic terminated epoxy resins. These materials are usually formed by reacting (meth)acrylic acid ((M)AA) with epoxy backbones. Alternatively, acrylic resins or resins that further comprise unsaturated side chains, for example allyl, vinyl, or vinyl ether groups may reacted with epoxy backbone resins. Suitable epoxy backbone resins include, for reaction with (M)AA, for example, aromatic epoxides including groups such as bisphenol A, bisphenol F, bisphenol S, and the like, as generally illustrated in Formula (3):

In one embodiment, one or more epoxy (meth)acrylate in the amount of from 15 to 100 phr, preferably from 25 to 50 phr, is used in combination with from 0 to 85 phr, preferably from 50 to 75 phr, of unsaturated polyester resins, and may further be mixed with a crystalline crosslinker resin.

Acrylic terminated or acrylic side chain functional polymers or resins may comprise acrylate or methacrylate unsaturation, although the unsaturated group left in the polymer for final curing of the powder coating need not be an acrylate or methacrylate group. It is also possible to form other solid resins having UV curing allyl, vinyl ether, and styryl functionalities. For example, a hydroxyl functional polyester resin, such as one made with neopentyl glycol, 1,4-cyclohexane dimethanol, terephthalic acid and adipic acid, can be reacted with TMI, to form a styryl-functional resin.

The $T_g$ of suitable acrylic terminated or acrylic side chain functional polymers or resins may be 40° C. or higher, and no higher than 149° C., or 121° C. Preferably, the unsaturated polyacrylate and polymethacrylate resins are solids at room temperature or above, so that they can be easily formulated into nonsintering powders. If the resins are liquids, they should be converted to powder form and, thus, be counted as a solid, by absorption onto inert silica-type filler materials, such as fumed silica, before use. The molecular weight of suitable acrylic terminated or acrylic side chain functional polymers or resins may range from 400 to 10,000, preferably 1,000 to 4,500. The % unsaturation range of suitable acrylic terminated or acrylic side chain functional polymers or resins may range from 2 to 20 weight percent (wt. %), preferably 4 to 10 wt. %, based on the weight of the polymer or resin.

The acrylate or methacrylate polymer resins are capable of crosslinking without an additional crosslinking agent, although crosslinkers may be used with such formulations.

Crystalline crosslinker resins increase the crosslinking density and improve the flow of coatings made therefrom. Suitable crystalline crosslinker resins have at least two free radical cured sites, e.g. unsaturated groups, per molecule, for example, divinyl ether resin, (meth)acrylate functional resin, allyl ether resin, allyl ester resin, or mixtures and combinations thereof. The $T_g$ or the melting point of crystalline

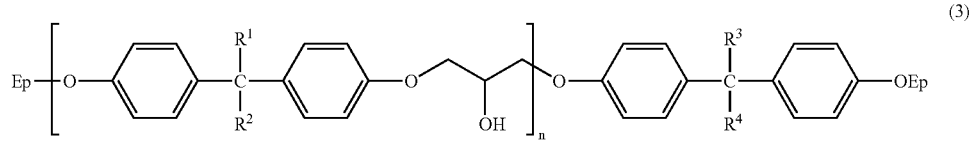

(3)

wherein $R^1$, $R^2$, $R^3$, and $R^4$ is each independently an aliphatic $C_1$-$C_6$ hydrocarbon or fluorohydrocarbon, preferably methyl; n=1-8, preferably 1-4; and Ep is an epoxide generally comprising the following structure (4):

(4)

Suitable commercial epoxide resins are exemplified by solid bisphenol A epoxy resins available under the trade names "GT-9013", "GT-7072" and "GT-6259", from Vantico.

crosslinker resins useful in the present invention ranges from 40 to 120° C., preferably from 40 to 60° C.

Crystalline crosslinker resins may preferably comprise vinyl ethers which have the following formula (5)

(5)

wherein $R^4$ is an aliphatic, aromatic, cycloaliphatic, araliphatic or heterocyclic group, optionally further comprising one or more than one functional group such as ether, polyether, ester, polyester, urethane, polyurethane, or a combination comprising at least one of the foregoing groups or functional groups; and n=2-10, preferably 2-4. A divinyl ether resin useful in the present invention is URACROS™ ZW 3307, from DSM, N.V., The Netherlands.

A particularly preferred crystalline crosslinker resin comprises divinyl ether terminated diisocyanate or urethane, such as a condensate of a diol or polyol and hexamethylene diisocyanate. These resins find particular utility as crosslinking agents for unsaturated polyester resins. Suitable crystalline vinyl ether resins include, for example, cyclohexanedimethanol divinylether, diethyleneglycol divinylether, ethyleneglycol divinylether, hexanediol divinylether, tetraethyleneglycol divinylether, trimethylolpropane trivinylether, polyalkylene glycol divinyl ether, divinyl ether terephthalates, such as bis((4-ethenyloxy)butyl) terephthalate, bis((4-ethenyloxy)butyl) 1,3-benzendicarboxylate, and tris(4-(ethenyloxy)butyl)1,3,5-benzenetricarboxylate, divinyl ether terminated crystalline urethanes that are the reaction product of diisocyanates, their dimers, uretdiones, isocyanurates and biurets, with hydroxyl-functional vinyl ethers, such as hydroxybutyl vinyl ether, hydroxyethyl vinyl ether or trimethylene glycol monovinyl ether, and chain extended vinyl ethers. Suitable diisocyanates for making divinyl ether urethanes include isophorone diisocyanate, methylene diisocyanate, hexamethylene diisocyanate, methylene biscyclohexyl isocyanate, trimethylhexamethylene diisocyanate, hexane diisocyanate, hexamethyl diisocyanate, hexamethylamine diisocyanate, methylenebiscyclohexyl isocyanate, toluene diisocyanate, 1,2-diphenylethane diisocyanate, 1,3-diphenylpropane diisocyanate, diphenylmethane diisocyanate, dicyclohexylmethyl diisocyanate, and the urethane dimers, uretdiones, isocyanurates, and biurets thereof.

Vinyl ether resins can be obtained, for example, by reacting a hydroxyl-functional vinyl ether with a multifunctional isocyanate-containing monomer or polymer in solvent, such as methylene chloride, under a nitrogen atmosphere, at temperatures from ambient to 125° C.

Suitable commercially available chain extended vinyl ethers include the Pluriol-E200 divinyl ether (PEG200-DVE), and poly-THF290 divinylether (PTHF290-DVE) from BASF Corp.

The crystalline crosslinker resins having acrylate or methacrylate groups may comprise di(meth)acryloyl urethanes, for example, such as the reaction product of a linear polybutylene glycol-co-hexamethylene diisocyanate and a hydroxyl-functional methacrylate, such as hydroxyethyl (meth)acrylate or hydroxybutyl (meth)acrylate. Other isocyanates can be used, such as those useful in forming divinyl ether urethanes. In addition, other suitable hydroxyl-functional methacrylates include hydroxypropyl methacrylate and other hydroxy alkyl methacrylates. This material can be formed the same way as the vinyl ethers above. A useful crystalline crosslinker may include urethane acrylate resin commercially available under the trade name VIAKTIN™ 3546 from Solutia.

Suitable allyl ester crystalline crosslinkers may include the reaction product of allyl alcohol and crystalline carboxylic acids (or their anhydrides), such as phthalic anhydride. Other suitable allyl ester resins include the reaction product of an allyl ester, such as allyl propoxylate, and a hydrogenated methylene diisocyanate, as well as diallyl phthalate prepolymers, iso-diallyl phthalate prepolymers, p-diallyl phthalate prepolymers, diallyl maleate, triallyl cyanurate, diallyl chlorendate methacrylamide, and triallylisocyanurate. Allyl ester resins find particular utility for use with the unsaturated polyester resins.

If the crystalline crosslinker resin is liquid or is sticky powder and is used in quantities up to about 5 wt. % of the powder coating composition, then this coreactant can be absorbed on an inert filler, such as fumed silica, thereby making it a solid within the preferred scope of this invention.

The relative amounts of free radical curing resin to crystalline crosslinker resin in the powder will depend on the choice of materials employed. Generally, such materials are employed in stoichiometric equivalent amounts to allow cross-linking to proceed to substantial completion, although an excess of either can be used if desired. From 1 to 50 phr of one or more than one crystalline crosslinker resin, preferably from 2 to 25 phr, and more preferably from 10 to 20 phr may be used in the powder of the present invention. When the resin is one or more acrylate or methacrylate functional polymer, it is preferred not to use the crosslinker.

Suitable commercial embodiments of free radical curing resins include, for example, unsaturated polyester resins commercially available under the trade name P-3125 from DSM, N.V., The Netherlands; under the trade name VAN-1743 from the Solutia; under the trade names PIOESTER 275, PIONEER P-1942, and P-1937, all from Pioneer Plastics, Auburn, Me.; ATLAC 363E, ATLAC 352, and DION 6694 ES, all from Reichold, Research Triangle Park, North Carolina; and the unsaturated polyester resin available under the trade name VIAKTIN™ 3890 from Solutia.

Suitable free radical photoinitiators for use in the coating powder according to the present invention include, for example, alpha-cleavage photoinitiators, hydrogen abstraction photoinitiators, and the like. Suitable alpha-cleavage photoinitiators include, for example, benzoin, benzoin ethers, such as isobutyl benzoin ether and benzyl ketals, such as benzyl dimethyl ketal, 2-hydroxy-2-methyl-1-phenylpropan-1-one, monoacyl phosphines, bisacylphosphine oxides such as diphenyl(2,4,6-trimethyl benzoyl)phosphine oxide, aryl ketones, such as 1-hydroxy cyclohexyl phenyl ketone, 4-(2-hydroxyethoxy)phenyl-2-hydroxy-2-propyl ketone, 2-benzyl-2-dimethylamino-1-(4-morpholinophenyl)-butan-1-one, 2,2-dimethoxy-2-phenylaceto-phenone, mixtures of benzophenone and 1-hydroxycyclohexyl phenyl ketone, perfluorinated diphenyl titanocene, and 2-methyl-1-(4-(methylthiophenyl)-2-(4-morpholinyl))-1-propanone, and the like. Suitable hydrogen abstraction photoinitiators include, for example, Michler's ketone(4,4'-bisdimethylamino benzophenone), Michler's ethyl ketone(4,4'-bisdiethylamino benzophenone ethyl ketone), benzophenone, thioxanthone, anthroquinone, d,I-camphorquinone, ethyl d,I-camphorquinone, ketocoumarin, anthracene, or derivatives thereof, and dimethoxy phenyl acetophenones, and the like. Other examples of free radical photoinitiators include benzophenones, or acetophenone derivatives, such as alpha-hydroxyalkylphenylketones. Examples of radical photoinitiators useful in the present invention are 1-hydroxycyclohexyl phenylketone, available under the trade name IRGACURE 184®; 2,2-dimethoxy-2-phenyl acetophenone, available under the trade name IRGACURE 651®; or 2-hydroxy-ethoxyphenyl-2-hydroxy-2-methylpropane-1-one, available under the trade name IRGACURE® 2959, each from Ciba-Geigy, Tarrytown, N.Y.

An effective total photoinitiator content of the powder coating can be readily determined by one of ordinary skill in the art, depending upon the types of free radical curing polymer systems employed, the amount of other constituent components, and the other properties desired in the coating. In general, however, an effective quantity of the total amount of the free radical photoinitiator is 0.1 to 10 phr, preferably 0.5 to 7.5 phr, and most preferably 1 to 3 phr.

One or more dry flow additives may individually be used in amounts of from 0.1 to 2.0 wt. %, based on the total weight of the coating powder, preferably from 0.1 to 0.5 wt.

%, more preferably from 0.2 to 0.35 wt. %. Suitable dry flow additives may include silica, fumed silica, zeolites, magnesia, fumed alumina and other metal oxides, and preferably include fumed alumina and fumed silica.

Waxes may be used in the coating powders to reduce gloss. Suitable waxes may comprise polyolefin, epoxidized polyolefin, polytetrafluoroethylene, and hydrocarbon waxes, such as polyethylene, polypropylene, oxidized polyethylene, oxidized polypropylene, microcrystalline polyolefin wax, paraffin, montan wax or carnauba wax, wherein said waxes have a $T_g$ or a melting point of from 40 to 120° C. Preferably, the one or more than one wax comprises polyethylene wax. Amounts of wax may range from 0.1 to 6.0 phr, preferably 0.5 to 3 phr.

To enhance the cross-linking rate during cure, thermal catalysts may optionally be employed. The inclusion of thermal free-radical initiators has been found to assist in curing near the substrate, particularly when pigmented, opaque, or thick film coatings are desired. Suitable catalysts include, for example, peroxides such as peroxy ketals such as 1,1-bis(t-butyl peroxy)-3,3,5-trimethylcyclohexane, diacylperoxides such as benzoyl peroxide, peroxy esters and peroxy carbonates; and transition metal and magnesium compounds based on fatty acids, oils, or tertiary amines, preferably cobalt soaps, such as cobalt octoate, cobalt neodecanoate, cobalt naphthenate, and cobalt octadecanoate. An effective amount of catalyst can be readily determined by one of ordinary skill in the art, depending upon the amount of cross-linking desired, types of free radical curing polymer systems employed, and amounts of polymer in the coating powder. In general, an effective quantity of peroxide catalyst may range from 0.01 to 5 phr, preferably from 0.05 to 3 phr, more preferably from 0.1 to 2 phr, and most preferably from 0.5 phr to 2 phr. In addition, effective quantities of metal catalyst may range from 0.01 to 1 phr, preferably 0.05 to 0.75 phr, and most preferably 0.1 phr to 0.5 phr.

Additives to aid or enhance the chemical and physical properties of the powder coating may be included such as pigments, fillers, flow control agents, dry flow additives, anticratering agents, surfactants, light stabilizers, plasticizers, degassing agents, wetting agents, anti-oxidants, matting agents, and non ionic surfactants, such as fluorinated non ionic surfactants, such as FLUORAD TM FC-4430 fluoroaliphatic polymeric esters from 3M Specialty Materials, St. Paul, Minn., and the like.

Suitable pigments for tinted clearcoats may include, for example, azo reds, quinacridone reds and violets, perylene reds, phthalocyanine blues, phthalocyanine green, phthalocyanine blue, blue tone phthalocyanine green, yellow tone phthalocyanine green, carbazole violet, monoarylide and diarylide yellows, tolyl and naphthol oranges, chromates, molybdates, phosphates, and silicates, silicas, aluminums, micas, and bronzes. iron oxide red, iron oxide yellow, lamp black, carbon black, silica, metal oxides, mixed metal oxides or combinations comprising at least one of the foregoing pigments. The powder coatings are clear to translucent and contain an accordingly low proportion of pigment, e.g. up to 40 phr or up to 30 phr or up to 10 phr or from 0.001 to 5 phr, a low proportion of colorant, e.g. up to 10 phr or up to 5 phr or up to 3 phr or from 0.001 to 1 phr, or they contain a clear to translucent, pigment, such as silica or alumina trihydrate having a particle size of less than 0.25 µm, in the amount of up to 120 phr or up to 60 phr.

Suitable fillers may include fillers for translucent coatings in through which the grain is visible, for example, calcium carbonate, barium sulfate, wollastonite, mica, china clay, diatomaceous earth, titanium dioxide, or combinations comprising at least one of the foregoing fillers in the amount of up to 25 phr or up to 15 phr.

Suitable flow control agents may include, for example, acrylic resins, silicone resins, combinations comprising at least one of the foregoing flow control agents, and the like. A suitable flow control agent for use in the present invention is RESIFLOW® P-67, an acrylate flow modifier, from Estron, Calvert city, Ky. Suitable dry flow additives include, for example, fumed silica, alumina oxide, and the like, or combinations comprising at least one of the foregoing dry flow additives. Suitable anticratering agents include, for example, benzoin, benzoin derivatives, low molecular weight phenoxy and phthalate plasticizers, and the like, or combinations comprising at least one of the foregoing anticratering agents. Suitable surfactants include, for example, acetylenic diol, and the like. Suitable light stabilizers include, for example, hindered amines, hindered phenols, or combinations comprising at least one of the foregoing light stabilizers. In general, effective quantities of flow control additives, anticratering agents, texturing agents, surfactants, or light stabilizers are individually from 0.1 to 15 phr, preferably from 0.5 to 5 phr.

The powder of the present invention may be produced using conventional techniques, e.g. by dry blending all ingredients in the appropriate amounts, followed by forming "fluid mixtures", such as melt mixtures or melt extruded powder forming ingredients, dispersions of one or more powder forming ingredients in melts of one or more powder forming ingredients, or aqueous dispersions or supercritical suspensions of powder forming ingredients that are extruded, pumped, homogenized or mixed together, followed by spraying to form a powder or by extruding and cooling or drying the extrudate and breaking the dry product into chips and grinding to a desired particle size. Fluid mixtures should be formed by blending below the melting point of any crystalline crosslinker present in the composition. Post-blend additives, such as dry flow additives, may be added prior to grinding or spray drying.

Chips or coarse powders may be ground in jet mills or impact mills equipped with cyclones or air classifiers, preferably with cooling, to powders having a desired average particle size. Additionally, once ground powders may be double ground to an average particle size of from 20 to 25 µm, which results in smooth, even coatings which may have acceptable low gloss, microtextured surfaces. If necessary, the once ground or double ground powders may be sorted according to size, e.g. by screening in a 270 to 400 mesh screen or by passing them through a cyclone classifier, to provide coatings with consistent smoothness.

Powder coating compositions having narrow particle size distributions and low average particle size polydispersity (pD) of from 1.5 to 4.5 may be produced by spray drying powder melts or fluid mixtures, or suspensions of powder compositions in high-pressure air or supercritical (SC) fluids, i.e. such as $CO_2$ that have been pressurized and/or heated to a level at or above its critical point. Spray drying gives the powders excellent handling and coatability properties despite their small particle size.

In making powder coating compositions, the raw material ingredients of the coating powders are incorporated in the solid phase before forming fluid mixtures to avoid potential processing difficulties. For example, particles, e.g. photoinitiators, containing any excess solvent may experience clumping, thus impeding the processing and application of the coating powder to the substrate. Desirably preliminary evaporation or other processing of such components convert them to powder or particulate form. Further, resins having desirable $T_g$s will be solid when first incorporated into a powder forming mixture.

In a second aspect, the present invention provides a method of making UV cured clear or translucent clear finishes on wood comprising of providing one or more waterborne stain compositions and one or more UV curing coating powder, applying one or more waterborne stain to the wood, drying or curing the thus formed waterborne stain layer, sanding or grinding to de-nibb the waterborne stain layer, applying UV curing coating powder to the stained substrate, flowing out the applied coating powder to form a continuous film, and UV curing the film formed from the powder.

Prior to staining the substrate, pre-sanding of the substrate with 120, 220 and then 320 grit sandpaper or pre-grinding the substrate surface with an equivalent grinding medium further aids in coating adhesion and smoothness. Pre-sanding with 120, 220 and then 320 grit sand paper, i.e. burnishing the substrate, limits the grain raise or fiber "pop-up" caused by waterborne stains.

Waterborne stains may be applied to substrates by wiping, brush, spray or any other suitable or recommended method. UV curing waterborne stains may be cured via UV curing in the same manner as powder coatings are UV cured. Oxidatively drying waterborne stains may be cured by convection or infrared (IR) heat, preferably directional convection, for a period of time that depends on the temperature of cure, or by air drying for from 4 to 14 hours. For example, a stain coating may be cured in as fast as 30 seconds at a high temperature limit of 177° C., or may be heat cured at temperatures as low as 65° C. for from 12 to 15 minutes. Cured or dried stain coats have thicknesses of up to 13 μm (0.512 mil).

Any oxidatively drying or UV curing waterborne stains may be used, including those comprising acrylic emulsions or dispersions, water soluble alkyds, water dilutable alkyds, polyurethane dispersions, polyvinyl acetate emulsions, modified polysaccharide polymers, such as carboxymethyl cellulose acetate butyrate, and copolymers of vinyl halide and vinylidene halide. One such waterborne stain comprises an acrylic-modified, core-shell long oil alkyd resin modified with a low molecular weight copolymer of styrene and maleic anhydride in a water dilutable partial ester form. Suitable waterborne stains may have solids contents of from 8 to 40 wt. %, preferably from 10 to 30 wt. %.

After substrates are stained and the stain is cured or dried, the substrates are then de-nibbed using 120, 220 and then 320 grade sandpaper or equivalent grinding media.

Prior to applying powder to substrates, the substrates may be pre-heated to a board surface temperature (end of cycle at exit from oven) of up to 200° F. (93° C.), preferably from 140 to 160° F. (60 to 71.1 1° C.) to facilitate the even flow of the powder on the substrate and outgassing of the substrate. However, pre-heating is not necessary if the stained substrate has a surface temperature of 38° C. or higher.

The coating powder may preferably be applied by electrostatically via corona discharge spray guns, to one or more optionally pre-heated substrates. It is desirable to encapsulate substrates, coating all sides thereof; however, coating powders can be applied to only one or more sides of a substrate. Small particle sized powders of from 5 to 20 μm average particle size may be applied from a fluidized bed, a magnetic brush or a spray nozzle in SC fluid or an air assisted nozzle in high-pressure air. Generally, electrostatic spray booths are employed that house banks of corona discharge or triboelectric spray guns and recirculators for recycling over sprayed powders back into the powder feed.

After application to substrates, the applied coating powder layer may be flowed out, for example, by exposure to infrared (IR) or convection heat to create a continuous film or a film having a more consistent profile. Heating may be performed in infrared, convection ovens, or a combination of both. Generally, flow out proceeds for a time effective to outgas substrate volatiles, which prevents surface defects such as blisters, craters, and pinholes from forming during curing. In accordance with the present invention, coated powders are flowed out for from 10 seconds to 10 minutes, preferably from 20 seconds to 5 minutes, and most preferably from 90 seconds to 3 minutes. Shorter flow out times are needed as the temperature of flow out is increased. Flow out temperatures may include any temperatures which will heat coated substrates to a board surface temperature (end of cycle at exit from oven) of from 190° F. (87.77° C.) to 215° F. (101.7° C.), preferably from 200 to 215° F. (93 to 101.7° C.). In accordance with the present invention, coated powders may be flowed by exposure to convection heat of from 120 to 350° F. (49 to 177° C.°), preferably from 150 to 300° F. (65 to 149° C.), and most preferably from 180 to 270° F. (82 to 132° C.). For example, powder coatings may be flowed out in ovens set at from 250° F. (121° C.) to 270° F. (132° C.) for 1 minute. Coated powders may be flowed out by IR heaters set at much higher temperatures, e.g. ranging from 400 to 815° C., and coated substrates may be exposed to such IR heaters for from 1 to 10 seconds to reach the desired substrate surface temperatures for flow out.

After the coating powder is heat fused onto the substrate, it may be allowed to cool, and is then exposed to a radiation source effective to activate the photoinitiator. Preferably, exposure is to a standard ultraviolet light source, such as a standard medium pressure mercury-vapor lamp, iron doped mercury-vapor lamp, and/or gallium doped mercury-vapor lamp, e.g., 600-watt Fusion H-, D- and/or V-lamps, respectively, to rapidly cure the coating films into smooth, hardened, low gloss finishes. Visible light or electron beam radiation may be used instead of UV radiation, if desired. Activation and cure of the free radical initiators in the coating typically takes from 1 millisecond to 120 seconds, preferably from 100 millisecond to 10 seconds, and typically less than 3 seconds, depending on the particular compositions and photoinitiators. The total energy supplied by the radiation source may range from 0.1 to 3.0 Joules/cm².

During UV cure, substrates may be exposed to low temperatures, for example from 150 to 180° F. (65.6 to 82.2° C.) to assist in curing, particularly where the coating powders comprise thermal initiators.

Throughout the coating process prior to the cooling of an applied coating, the surface of the coated substrate at the end of any heating cycle, upon exit from the oven, should not exceed 215° F. (101.7° C.) during any part of the coating process. So long as the coating is fused and cured, the lower the surface temperature of the substrate, the better the quality of the smoothness properties in the product coating.

Suitable substrates may include any heat-sensitive materials, for example natural woods like hardwood, wood veneers as well as hard board, laminated bamboo, plywood, wood composites and engineered wood, such as particle board, electrically conductive particle board, high, medium (MDF), or low density fiber board, and other substrates that contain a significant amount of wood. In particular, substrates include materials that are used in the furniture industry, including open grain natural wood substrates which call for fillers or sealers, such as those chosen from oak, mahogany, ash, hickory, teak and walnut and, further, including close grain natural wood having more uniform pore sizes, and not calling for fillers or sealers, chosen from alder, aspen, basswood, beech, birch, cedar, cherry, fir, hemlock, maple, pine and spruce. Accordingly, furniture articles that may be coated according to the method of the present invention cabinets, doors, furniture, wood moldings, wall and floor trim.

Some embodiments of the invention will now be described in detail in the following Examples.

EXAMPLES 1-3

Effect of Solventborne Stain and Waterborne Stain on Adhesion

To determine adhesion of powder coatings to coated wood, each of three flat Red Oak panels (152.4 mm×152.4 mm×19.05 mm or 6 in×6 in. 0.75 in. thick) were pre-sanded with 220 grit sandpaper and stained with no stain (Example 1), solventborne stain (Example 2) and waterborne stain (Example 3), as set forth in Table 2, below. The applied stains were air dried for from 20 to 30 minutes at ambient temperature. The panels were then preheated for 0.5 minutes at 149° C. (300° F.) to a board surface temperature of 65° C. (160° F.). The panels were electrostatically spray coated with the extruded, impact milled coating powder (screened at 325 mesh (44 µm); average particle size of 22 µm) as set forth in Table 1, below, at a board surface temperature of 43.3° C. (110° F.) to a powder coating thickness of from 25.4 to 38.1 µm (1.0-1.5 mils). The thus applied powder layers on each panel were then flowed out for 2.5 minutes at 149° C. (300° F.) and were UV cured using 200 watt mercury lamps with a 1000 mj/cm$^2$ dosage.

The resulting coated panels were then tested for cross hatch adhesion, resistance to vegetable oil, resistance to MURPHY PURE VEGETABLE OIL SOAP™ and foam in coating. Each test was performed as follows:

Cross hatch adhesion ASTM-D3359 (2002)

Resistance to vegetable oil was tested according to KCMA A161.1 (1995).

Resistance to MURPHY PURE VEGETABLE OIL SOAP™ was tested according to KCMA A161.1 (1995).

Foaming was determined by visual inspection of cooled coated panels. "None" means that that finish has no visible texture or haze or any visible bubbles that can be seen by the naked eye from 1 foot away.

TABLE 1

| INGREDIENT | WEIGHT PARTS |
|---|---|
| Bisphenol A Epoxy Acrylate | 50 |
| Fumarate Polyester (approx 3 to 5 wt. % unsaturation) | 40 |
| Urethane Vinyl Ether (hydroxybutyl vinyl ether endcapped hexamethylene diisocyanate) | 15 |
| Polyolefin matting agent | 1.6 |
| Polyolefin matting agent (polyethylene) | 2.4 |
| polyacrylate flow modifier | 1.5 |
| α-hydroxy ketone photoinitiator | 2.0 |
| Triazole UV absorber | 1.0 |
| TOTAL in Ground Extrudate | 113.5 |
| fumed aluminum oxide - post blend dry flow additive | 0.3% wt. % |

TABLE 2

| TEST | EXAMPLE 1 No Stain | EXAMPLE 2 Linseed oil based Spray Stain | EXAMPLE 3 Lilly Waterborne stain |
|---|---|---|---|
| Cross hatch Adhesion ASTM | 5B | 3B | 5B |
| Resistance to Vegetable Oil 24 hrs | Fail | Fail | Pass |
| Resistance to Murphy Oil Soap (24 hrs) | Fail | Fail | Pass |
| Foam in coating | None | None | None |

The above data indicates that superior adhesion and durability is obtained in powder coatings over the water based stain on oak, that good adhesion is obtained in powder coatings over bare oak, and that the powder coating used provides a foam free coating on oak, even oak that has not been stained. In comparison, powder coatings on solventborne stained oak show only fair adhesion and poor durability.

EXAMPLES 4 to 6

Effect of Waterborne vs. Solventborne Stain on Powder Coatings on Stained Wood

Four solid oak panels (152.4 mm×152.4 mm×19.05 mm or 6 in.×6 in. 0.75 in. thick) were pre-sanded with 220 grit sandpaper. The stain was applied to each panel as indicated in Table 3, below, and each panel was then air dried for 10 minutes, followed by curing for 20 minutes at 49° C. (120° F.). The resulting stained panel having a board surface temperature of 110° F. (43.33° C.) was then powder coated electrostatically with the powder coating composition shown in Table 1 post heated at 300° F. (149° C.) for 3 minutes and UV cured using 600 watt mercury lamps with a 1200 mj/cm$^2$ dosage.

TABLE 3

| EXAMPLE | BINDER COMPOSITION | PIGMENTS | ADHESION RATING |
|---|---|---|---|
| 4 | Solventborne Wiping Stain: Soya and linseed oil oxidizing alkyds | Burnt umber, transparent red oxide, van dyke brown, dinitro-aniline orange, raw umber, carbon black and TiO2. | 1 |
| 5 | Solventborne Wiping Stain: Soya and linseed oil oxidizing alkyds | Burnt umber, transparent red oxide, van dyke brown, dinitro-aniline orange, raw umber, carbon black and TiO2. | 1 |
| 6 | Waterborne Wiping Stain: Oxidatively drying, acrylic-modified, core shell, long oil alkyd resin; modified with a low molecular weight copolymer of styrene and maleic anhydride in a partial ester form. | Burnt umber. | 9 |

Rating subjective 1 to 10, 10 being very good, 7 being "acceptable" and 1 being very bad. The adhesion rating test was run on panels coated and cooled just prior to testing.

The adhesion test is based on a combination of cross-hatch adhesion and nickel mar tests. Cross hatch adhesion is determined using ASTM-D3359 (2002). "Nickel mar" refers to a test in which the edge of a nickel is rubbed against the coating and tests the durability and resistance to delamination of a coating.

As the Examples show, UV cured powder coatings of the present invention show very good adhesion to wood coated with waterborne stain and very bad adhesion to wood coated with solvent borne stain.

We claim:

1. A smooth and even coating on a wood substrate comprising:
    one, two or three layers of one or more waterborne stain or tinted waterborne basecoat; and,
    one or more topcoat layers of clear or tinted clear powder coatings comprising one or more than one free radical UV curing resin, one or more than one photoinitiator, and one or more than one post-blend dry flow additives, wherein the said powder coating is formed from a coating powder having an average particle size of from 5 to 25 µm.

2. A coating as claimed in claim 1, wherein the total thickness of the said one or more topcoat layers ranges from 0.5 mil (12.7 µm) to 2.0 mil (50.8 µm).

3. A coating as claimed in claim 1, wherein the said powder coating further comprises one or more than one crystalline crosslinker resin.

4. A coating as claimed in claim 3, wherein the said one or more than one crystalline crosslinker resin comprises vinyl ether resin.

5. A coating as claimed in claim 1, wherein the said substrate has an uneven, curvilinear, beveled or routered surface, or a combination thereof.

6. A coating as claimed in claim 1, wherein the said substrate is chosen from open grain natural wood and close grain natural wood.

7. A method for making a coating as claimed in claim 1 comprising:
    providing one or more waterborne stain compositions and one or more clear or tinted UV curing coating powder,
    applying the said one or more waterborne stain to the wood to form a stain layer,
    drying or curing the said stain layer,
    sanding or grinding to de-nibb the said stain layer,
    applying the said clear or tinted UV curing coating powder to the stained substrate,
    flowing out the applied coating powder to form a continuous film, and UV curing the film formed from the powder.

8. A method for making a coating as claimed in claim 7, further comprising pre-sanding or pre-grinding the said surface prior to applying said waterborne stain.

9. A method for making a coating as claimed in claim 7, further comprising pre-heating the said stained substrate surface prior to applying said UV curing coating powder.

* * * * *